(12) United States Patent
Bierweiler et al.

(10) Patent No.: US 12,187,298 B2
(45) Date of Patent: Jan. 7, 2025

(54) METHOD AND APPARATUS FOR MONITORING OPERATION OF A TECHNICAL OBJECT

(71) Applicant: Siemens Aktiengesellschaft, Munich (DE)

(72) Inventors: Thomas Bierweiler, Karlsruhe (DE); Jana Kemnitz, Vienna (AT); Daniel Schall, Hollabrunn (AT); Stefan Von Dosky, Karlsruhe (DE); Roman Khazankin, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 407 days.

(21) Appl. No.: 17/578,563

(22) Filed: Jan. 19, 2022

(65) Prior Publication Data

US 2022/0227378 A1 Jul. 21, 2022

(30) Foreign Application Priority Data

Jan. 21, 2021 (EP) .................................. 21152772

(51) Int. Cl.
*B60W 50/02* (2012.01)
*B60W 50/00* (2006.01)
(Continued)

(52) U.S. Cl.
CPC .... *B60W 50/0225* (2013.01); *B60W 50/0205* (2013.01); *G06F 18/22* (2023.01);
(Continued)

(58) Field of Classification Search
CPC ..... B60W 50/0205; B60W 2050/0057; B60W 2050/021; G06F 18/22; G06F 11/3089;
(Continued)

(56) References Cited

U.S. PATENT DOCUMENTS 8,797,358 B1 * 8/2014 Tseng ........................ G09G 5/00
345/649
10,416,755 B1 * 9/2019 Erivantcev ............. G06V 10/82
(Continued)

FOREIGN PATENT DOCUMENTS

DE 102009045493 4/2010
DE 102015115282 3/2017

OTHER PUBLICATIONS

EP Search Report dated Jun. 7, 2021 based on EP21152772 filed Jan. 21, 2021.

*Primary Examiner* — Chad G Erdman
(74) *Attorney, Agent, or Firm* — Cozen O'Connor (57) ABSTRACT

Method for monitoring operation of a technical object, wherein a) a first orientation of the first acceleration sensor in the form of a position vector is determined, b) the mathematical model for operation of the object is generated and trained, c) the first acceleration sensor is disassembled and a three-axis replacement acceleration sensor is assembled with a new orientation on the object, d) acceleration values are detected, e) respective indicator values are calculated from the temporal course of the detected acceleration values of the replacement acceleration sensor, f) a replacement vector is determined from the indicator values and a differential vector between the replacement vector and the position vector of the first acceleration sensor determined in step b) is determined, and g) the model during operation of the object for the position vector in the orientation of the replacement vector is applied by taking into account the differential vector.

15 Claims, 3 Drawing Sheets

(51) Int. Cl.
*G06F 18/22* (2023.01)
*G06N 20/00* (2019.01)

(52) U.S. Cl.
CPC ..... *G06N 20/00* (2019.01); *B60W 2050/0057* (2013.01); *B60W 2050/021* (2013.01)

(58) Field of Classification Search
CPC .. G06F 30/27; G06F 2111/10; G06F 2119/12; G06N 20/00; G01M 7/00; G01M 13/005; G01H 1/00
See application file for complete search history.

(56) References Cited

U.S. PATENT DOCUMENTS

| | | |
|---|---|---|
| 2009/0056456 A1 | 3/2009 | Hall et al. |
| 2020/0272139 A1 | 8/2020 | Rakuff et al. |
| 2022/0206566 A1* | 6/2022 | Senkal ................. G06T 7/70 |

* cited by examiner

METHOD AND APPARATUS FOR MONITORING OPERATION OF A TECHNICAL OBJECT

BACKGROUND OF THE INVENTION

1. Field of the Invention

The invention relates to a computer program, an electronically readable data carrier, a data carrier signal and a method for monitoring the operation of a technical object with the aid of a mathematical model based on machine learning after the assembly of a three-axis replacement acceleration sensor, where a three-axis first acceleration sensor is initially assembled on the object at a position and the object generates mechanical oscillations during operation, and where a) a first orientation of the first acceleration sensor on the object in the form of a position vector relative to the gravitational force is determined, b) the mathematical model for the operation of the object with respect to the position vector is generated and trained, and c) the first acceleration sensor is disassembled and the three-axis replacement acceleration sensor is assembled with a new orientation on the object at the same position, at which the first acceleration sensor was assembled.

The invention additionally relates to an apparatus for operating a technical object, comprising a computing apparatus with a memory, and a connected detection device for detecting sensor values in the form of a three-axis acceleration sensor, where the computing apparatus is configured to generate, train and store a mathematical model based on machine learning, and the three-axis acceleration sensor is assembled on the object at a position, and during operation the object generates mechanical oscillations.

2. Description of the Related Art

Systems for monitoring technical objects, such as devices, motors, pumps, machines and installations can detect their mechanical movements, for instance, in order to derive therefrom operating hours or to determine operating characteristics, to identify or predict error statuses, or to also define maintenance intervals or repairs in order to optimal availability of the technical object.

Conventional systems for evaluating oscillations, such as CMS X-Tools, can detect and evaluate rollover frequencies of sliding rings, for instance, by evaluating individual oscillation frequency bands or an RMS value, according to DIN ISO 10816, for instance.

Furthermore, data-driven AI methods can also identify previously unknown deviations or form novel error classes.

The disadvantage of such systems, however, is that with a sensor change, caused by a fault, maintenance or battery change, for instance, costly retraining of a model based on artificial intelligence is required, if the model is adapted to the sensor.

The sensor can be assembled in a twisted or bent manner as a result of the re-assembly, however, which results in an unwanted change in the orientation with respect to the original orientation of the sensor assembled previously. Here, the detected measured values can be so inaccurate that a further use of the model can be significantly restricted.

SUMMARY OF THE INVENTION

It is an object of the invention to provide a method, via which the further use of a mathematical model for the operation of the technical object is simplified in conjunction with an acceleration sensor.

This and other objects and advantages are achieved by a method for monitoring the operation of a technical object with the aid of a mathematical model based on machine learning after the assembly of a three-axis replacement acceleration sensor, where a three-axis first acceleration sensor is initially assembled on the object at a position and the object generates mechanical oscillations during operation, and where of the type cited in the introduction, wherein a) acceleration values in the x-, y- and z-direction with the aid of respective individual sensors of the three-axis replacement acceleration sensor of the object are detected, respective indicator values from the temporal course of the detected acceleration values of the replacement acceleration sensor are calculated, a replacement vector from the indicator values are determined and a differential vector between the replacement vector and the position vector of the first acceleration sensor determined in step b) is determined, and the model during operation of the object for the position vector in the orientation of the replacement vector is applied by taking into account the differential vector.

With the disclosed method of the invention, an existing or generated model based on artificial intelligence can be reused, even if a corresponding acceleration sensor assembled on the object is assembled again.

As a result, it is possible to dispense with a renewed training of the model with the re-assembled sensor.

The operation of the technical object is the operational state in which mechanical oscillations are generated, which are detected by the acceleration sensors S1 and ES.

The cited indicator values each relate to a measured variable of the three-axis acceleration sensor. In other words, a separate indicator value, with which an acceleration can be detected in the associated axis, is present for each axis of the three-axis acceleration sensor.

It is clear that, depending on the arrangement of the replacement acceleration sensor in respect of the gravitational direction, different accuracies can be achieved with respect to the differential vector. A variation with respect to assembly in the direction of the gravitational direction can possibly be identified more inaccurately than a variation at right angles to the gravitational direction.

It is also clear that the generation and training of a mathematical model for the operation of the object includes the detection of acceleration values in the x-, y- and z-direction with the aid of respective individual sensors of a three-axis acceleration sensor with respect to the object.

The new orientation of the replacement acceleration sensor on the object relates to the original orientation of the first acceleration sensor, where the position between the first acceleration sensor and the replacement acceleration sensor is the same.

In one embodiment of the invention, the indicator value is determined with the aid of an average value over a time sequence of the acceleration values. As a result, it is possible for the indicator value to be determined in a particularly simple manner.

In another embodiment of the invention, the indicator value to be determined with the aid of a steady component of a Fast Fourier Transform (FFT) over a time sequence of the acceleration values. As a result, it is possible for the indicator value to be determined in a particularly simple manner.

In another embodiment of the invention, a correction of the position vector is performed with the aid of the differential vector determined in step f) when a predetermined limit value is exceeded for the differential vector determined in step f). As a result, it is possible to easily identify whether a sensor has been replaced or also whether a sensor has been unwantedly triggered during operation, such as with a break in the corresponding mounting of the sensor, and an automatic adjustment via the differential vector.

In a further embodiment of the invention, a sensor change from the first acceleration sensor to the replacement acceleration sensor is identified when a predetermined limit value is exceeded for the differential vector determined in step f). As a result, it is possible to easily identify whether a sensor has been replaced or also whether a sensor has been unwantedly triggered during operation, such as with a break in the corresponding mounting of the sensor.

When a sensor is replaced, it may be necessary for an authentication of the acceleration sensor and an assignment to the technical object to be performed in order to be able to reliably differentiate, for instance, between an unwanted break from the mounting or a detachment of the mounting and to be able to document this accordingly. An automatic identification of a sensor replacement is therefore not always necessary.

In another embodiment of the invention, the Euclidian distance for the differential vector determined in step f) is formed over at least one time instant and an operating state analysis of the object is performed by applying the mathematical model and the Euclidian distance of the differential vector. As a result, the model of the technical object can be easily improved by the differential vector being taken into consideration as a parameter in the model.

In a further embodiment of the invention, the differential vector is determined repeatedly over a temporal course, and an average value is preferably calculated over the temporal course of the differential vector. As a result, a slow change in the sensor, such as via a sensor drift, can be easily detected, for instance, and a sensor maintenance can be introduced, for instance.

In another embodiment of the invention, a mathematic model based on machine learning is generated, trained and applied for the object with the aid of the differential vector determined in step f), and the operation of the object is monitored with the aid of the model. This means that the mathematical model for the technical object additionally includes sensor-specific information and the statement of the model can therefore be extensive.

In a further embodiment of the invention, the mathematic model is generated, trained and applied with the aid of the temporal course of the differential vector. As a result, this means that the mathematic model for the technical object additionally includes dynamic, time-dependent sensor-specific information and the statement of the model can therefore be extensive.

In yet a further embodiment of the invention, the first acceleration sensor and the replacement acceleration sensor are identical in construction.

"Identical in construction" is understood to mean that the sensors can be replaced with one another and can, for instance, generate compatible sensor data and have the same positions of the integrated individual sensors with respect to the assembly location. As a result, the mathematical model can be implemented more easily and the method can be simplified overall.

In a further embodiment of the invention, the object is in operation during step d). As a result, it is possible for a downtime during the maintenance of the technical object and the sensor to be reduced, since a determination of the differential vector can also occur during ongoing operation of the technical object.

It is also an object of the invention to provide a computer program, comprising commands which, with their execution via a computer, trigger the computer to perform the method in accordance with disclosed embodiments, in particular steps d) to g).

It is also an object of the invention to provide an electronically readable data carrier with readable control information stored thereupon, which comprises at least one inventive computer program and is configured to implement the disclosed embodiments of the method when the data carrier is used in a computer facility.

It is a further object of the invention to provide a data carrier signal, which transmits the inventive computer program.

It is a further object of the invention to provide an apparatus for operating a technical object, comprising a computing apparatus with a memory, and a connected detection device for detecting sensor values in the form of a three-axis acceleration sensor, where the computing apparatus is configured to generate, train and store a mathematical model based on machine learning, and the three-axis acceleration sensor is assembled on the object at a position, and during operation the object generates mechanical oscillations, where the computing apparatus is configured to perform the disclosed embodiments of the method with the aid of sensor values detected by the detection means.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in more detail below on the basis of an exemplary embodiment shown in the appended drawings, in which.

DETAILED DESCRIPTION OF THE EXEMPLARY EMBODIMENTS

Figure 1:
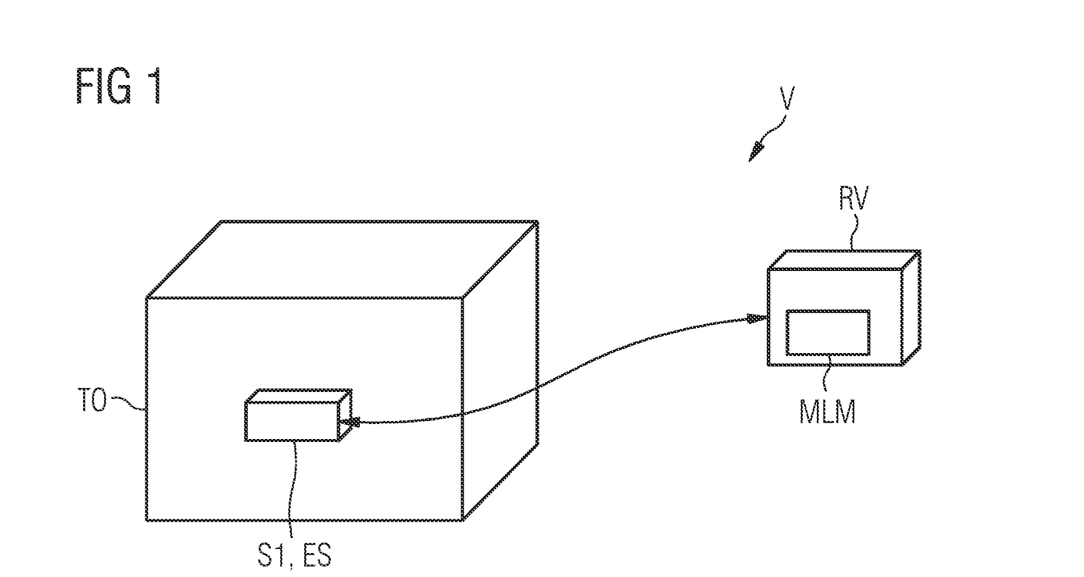
FIG. 1 shows an exemplary embodiment of an inventive apparatus with a representation of a technical object and an assembled three-axis acceleration sensor in accordance with the invention.

FIG. 1 shows an exemplary embodiment of an inventive apparatus V with a representation of a technical object and an assembled, three-axis acceleration sensor. The technical object TO can be a motor, a pump, a processing machine or suchlike, for instance.

A three-axis acceleration sensor S1 is fastened to the technical object TO. The three-axis acceleration sensor S1 is used to monitor mechanical vibrations or movements of the technical object TO, in order to determine an operating duration therefrom, for instance.

A computing apparatus RV with a memory further has means of detecting sensor data of the sensor S1.

Moreover, a mathematic model MLM based on artificial intelligence is present in the computing apparatus RV, in other words machine learning (ML), of the technical object TO, where the ML model describes the object TO in its operation.

Figure 2:
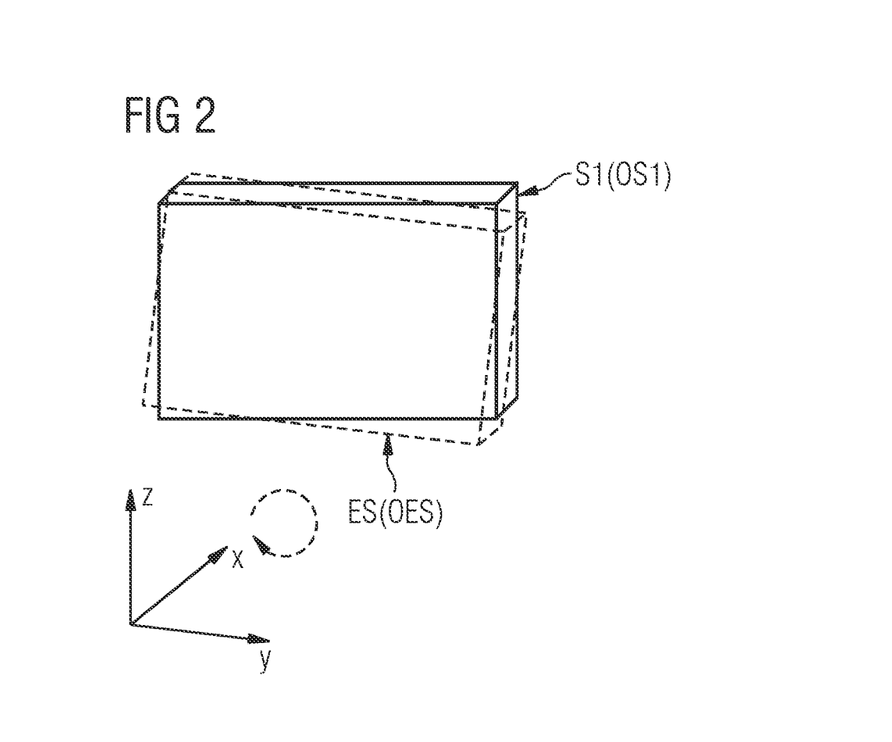
FIG. 2 shows a detailed view of the acceleration sensor of FIG. 1 with a modified orientation.

FIG. 2 shows a detailed view of the acceleration sensor shown previously with a modified orientation, in other words a rotation and no translation or at least a very minimal translation compared with the installation size of the acceleration sensor or the individual integrated sensors in the respective axis direction.

In most cases, the modified orientation is not present here about a notional point of rotation which is not shown in the Figure, however. This can occur, for instance, if the sensor S1 for maintaining or repairing the technical object TO or the sensor S1 itself is disassembled and re-assembled. Assembly can occur via screws, mountings or adhesives, for instance.

A fastening via Velcro fastener for adhesion purposes, comprising a clamping and Velcro part, is also possible, for instance. It is favorable here if care can be taken to ensure the adherence to the position, for instance, via a corresponding marker or an assembly frame.

A battery replacement or an interrupted mounting may also require reassembly of the sensor S1.

FIG. 2 shows, by rotation about the x-axis, that a modified orientation OES of a replacement sensor ES may be present after a first assembly of the sensor S1 with an orientation OS1.

Figure 3:
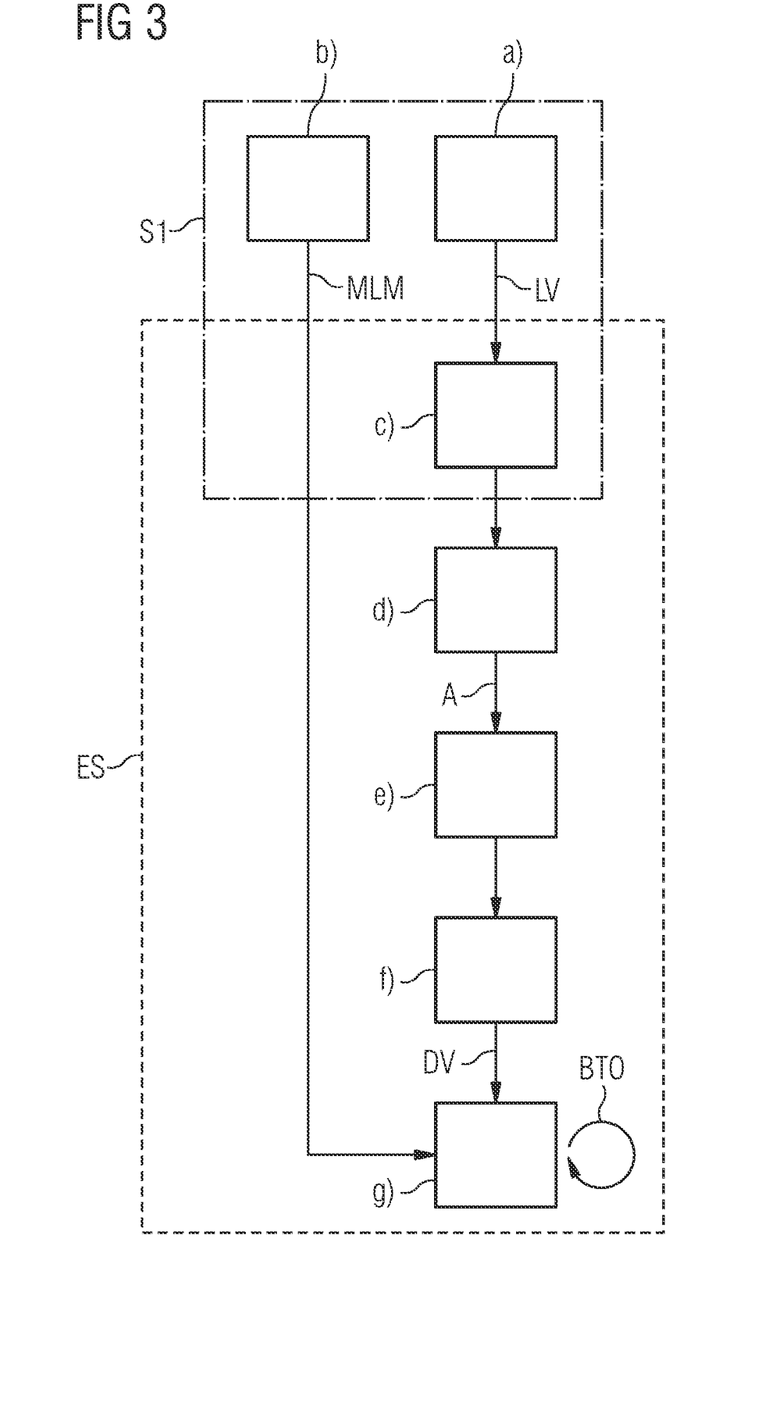
FIG. 3 shows an exemplary embodiment of a flow chart of the method in accordance with the invention.

FIG. 3 shows an exemplary embodiment of a flow chart of the inventive method. The method is used to monitor the operation of a technical object TO, such as a motor, with the aid of a mathematical model MLM based on machine learning.

A three-axis first acceleration sensor S1, for instance, based on microelectromechanical systems (MEMS), is firstly assembled on the object TO at a position. During operation, the technical object TO generates mechanical oscillations or vibrations, which can be mapped by the ML model MLM into operating properties or operating states.

The generation and training of the ML model MLM for the operation of the object can occurs via detecting acceleration values in x-, y- and z-direction with the aid of respective individual sensors of a three-axis acceleration sensor with respect to the object.

The following are now performed a) a first orientation OS1 of the first acceleration sensor on the object TO in the form of a position vector LV relative to the gravitational force is determined, b) the mathematical model MLM for the operation of the object TO is generated and trained with respect to the position vector LV, c) the first acceleration sensor S1 is disassembled and assembly of the three-axis replacement acceleration sensor ES is assembled with a new orientation OES on the object TO at the same position at which the first acceleration sensor A1 was assembled, d) acceleration values A in the x-, y- and z-direction are detected with the aid of respective individual sensors of the three-axis replacement acceleration sensor ES of the object TO, e) respective indicator values are calculated from the temporal course of the detected acceleration values A of the replacement acceleration sensor ES, f) a replacement vector from the indicator values is determined and a differential vector DV between the replacement vector and the position vector LV of the first acceleration sensor S1 determined in step b) is determined, and g) the model MLM, during operation BTO of the object TO, is applied to the position vector LV in the orientation of the replacement vector by taking into account the differential vector DV.

It is particularly advantageous for the method if the gravitational field of the earth is measured on average over a longer period of time, such as 1 hour or 1 day.

Oscillation sensors are generally fastened to a thread. After initial assembly, it is possible to average over a longer period of time, such as 1 hour or 1 day, and for the alignment of the x-, y- and z-axis to be detected.

For the sensor SITRANS MS200, the y-axis is identical to the thread direction, in other words the SITRANS MS200 is tightened about the y-axis during assembly. After initial assembly, a system for anomaly detection for the technical object TO can be learnt on the basis of artificial intelligence or states can be determined.

After the initial assembly of the sensor S1, the following self-diagnosis functions can be used:

Identifying a "distortion" (deviation of the y-axis): For all assembly directions, the deviation of the y-axis can be identified by averaging over a suitably long-time range, such as 1 hour or 2 day. An error then occurs, for instance, if the sensor drops, the mounting is bent or the sensor is disassembled. Also, a tilting, falling over or dropping of the technical object TO to be monitored can result in a deviation of the y-axis.

Identifying a rotation about the y-axis: if the y-axis is not aligned parallel to the gravitational field (vertical assembly of the sensor), a rotation about the y-axis can be identified with a suitably long averaging. An error then occurs for instance if the sensor drops, the fastening becomes looser or the sensor is disassembled. A tilting, falling over or dropping of the technical object to be monitored TO can also result in a rotation.

A sensor error of the three-axis sensor S1 can be identified because, on average, the total of the acceleration measured values does not correspond to the gravitational field. Here each acceleration direction is averaged, for instance.

$$x_{mean} = \frac{1}{N}\sum x, \; y_{mean} = \frac{1}{N}\sum y, \; z_{mean} = \frac{1}{N}\sum z$$

where N represents the number of measured values. As a tolerance, 10% of the gravitation can be permitted, for instance. An average value R should be 0.9 G<R<1.1 G, wherein:

$$R = \sqrt{x_{mean}^2 + y_{mean}^2 + z_{mean}^2}$$

If the acceleration sensor S1 goes into saturation, in other words, an end of the measuring range is reached, then this can therefore be identified by determining the maximum or minimum acceleration over a longer time range (e.g., 1 day). If the maximum or minimum measured value corresponds to the maximum or minimum possible measured value, then a saturation therefore exists for the sensor. The sensitivity of the acceleration can optionally be adjusted.

It should be understood these functions are also applicable to the replacement acceleration sensor ES.

After the reassembly of the technical object TO, the correct assembly can be checked by evaluating the averaged acceleration in the y-direction. The averaged acceleration in the y-direction after the reassembly must correspond to the averaged value of the acceleration of the y-direction after the initial assembly. A deviation in the y-direction (inclination) with respect to the horizontal, i.e., a rotation upward or downward, can be compensated by rotation in spherical coordinates. The oscillation measured value y is mapped according to y'. A horizontal rotation cannot be determined with the aid of the gravitational field. The determination of the horizontal rotation with the aid of a comparison of the average values during the initial assembly may be too prone to errors, because the operating state of the installation and thus of the object TO is unknown and the wear margin of the object TO is likewise unknown. Both the operating state and also the state of the object TO can significantly influence the available oscillations.

If the assembly occurred correctly, then in the next step the rotation about the y-axis can be corrected (restriction with vertical assembly). After reassembly, the direction of rotation can be determined from the averaged measured values of the x- and y-direction (or optionally from the steady component of a Fourier transform):

$$\varphi_n = a\tan 2(z_{mean}, x_{mean})$$

The current direction of rotation can be compared with the direction of rotation of the initial assembly of sensor S1 and corrected from the point in time of the reassembly for all oscillation measured values in cylinder coordinates (polar coordinates). The direction of the cylinder corresponds here to the direction of the assembly axis (y-axis). The correction angle $\Delta\varphi$ can be calculated by:

$$\Delta\varphi = <\varphi_n - \varphi_1$$

The transformation reads (inverse transformation):

$$x' = x \cdot \cos(\Delta\varphi) - z \cdot \sin(\Delta\varphi)$$

$$z' = x \cdot \sin(\Delta\varphi) + z \cdot \cos(\Delta\varphi)$$

If the sensor is assembled vertically, then the determination of the direction of rotation $\varphi_n$ with the aid of the gravitational field is not possible. The direction of rotation can now occur via a comparison with the oscillation parts after the initial assembly. As cited above, this method may be prone to error, however, because there may be a dependency on the operating state of the object TO and on the wear of the object TO.

An anomaly detection which combines the x and z direction with $$xz = \sqrt{x^2 + y^2}$$

and evaluates mutually may be more robust, for instance.

All further reassemblies can likewise be compared with the initial assembly, the rotation is determined and corrected accordingly. In this example, all detected oscillation measured values are rotated according to the determined transformation. For the further processing, such as via a system for anomaly detection, the transformed values x', z' and y' can be used.

The correction of the assembly direction is further advantageous because periods of time before and after a reassembly can be used for learning a data-driven anomaly detection. This is particularly advantageous if operating states differ in different seasons and have to be learnt.

As an alternative to rotating the acceleration values after a reassembly with respect to the coordinate system before the assembly, a calculation can also be performed in the local coordinate system from the very beginning. For this purpose, after the initial installation and further installations, the alignment of the replacement acceleration sensor ES can then be determined via an adequate averaging and converted into the local coordinate system.

The operation BTO of the object TO is the operating state in which mechanical oscillations are generated, which are detected by the acceleration sensors S1 and ES.

Steps a) and b) can occur independently of one another and in any sequence. Step a) can occur during or outside of the operation of the technical object TO, while for step b) an operation of the technical object TO is required, because the operation is to be reproduced by the ML model MLM.

The indicator value can be determined, for instance, with the aid of an average value over a temporal sequence of the acceleration values A.

Alternatively, the indicator value can be determined, for instance, with the aid of a steady component of an FFT transform over a temporal sequence of acceleration values A.

In a first embodiment of the invention, if a predetermined limit value is exceeded for the differential vector DV determined in step f), then a correction of the position vector LV can be performed with the aid of the differential vector DV determined in step f).

In a further embodiment of the invention, if a predetermined limit value is exceeded for the differential vector DV determined in step f), then a sensor change from the first acceleration sensor S1 to the replacement acceleration sensor ES can be identified.

In another embodiment of the invention, the Euclidean distance for the differential vector DV determined in step f) can be formed over at least one point in time, and an operating state analysis of the object TO can be performed by applying the mathematic model MLM and the Euclidean distance of the differential vector DV.

In a further embodiment of the invention, the differential vector DV can be determined repeatedly over a temporal course. Here an average value can optionally be calculated over the temporal course of the differential vector DV.

In another embodiment of the invention, a mathematical model MLM can be generated, trained and applied based on machine learning for the object TO with the aid of the differential vector DV determined in step f), and the operation of the object TO can be monitored with the aid of the model (MLM).

In addition to the two preceding embodiments, the mathematical model MLM can be generated, trained and applied with the aid of the temporal course of the differential vector DV, for instance.

It is favorable if the first acceleration sensor S1 and the replacement acceleration sensor EV are identical in construction, because as a result the model MLM for the technical object TO is simpler.

It is further favorable if the object TO is in operation, during step d), because as a result an unwanted operating downtime of the object can be reduced and the availability of the object can therefore improve.

By applying the model MLM during operation BTO of the object TO, the forecast of operating properties of the technical object TO can be understood in the form of a control of operations, for instance. Artificial intelligence can be applied here and a classification of sensor values of the acceleration sensor can occur, and a similarity to trained classes can be determined.

It is clear that several acceleration sensors can also be used at various positions, which flow into the model MLM and these sensors are detected by the inventive method. It is also clear that the model MLM can also include at least one further sensor, which is however not an acceleration sensor, but instead a temperature sensor. A sensor of this type can however not be detected by the inventive method, because no orientation of the technical object or of the sensor relative to the earth gravitation can be identified.

Figure 4:
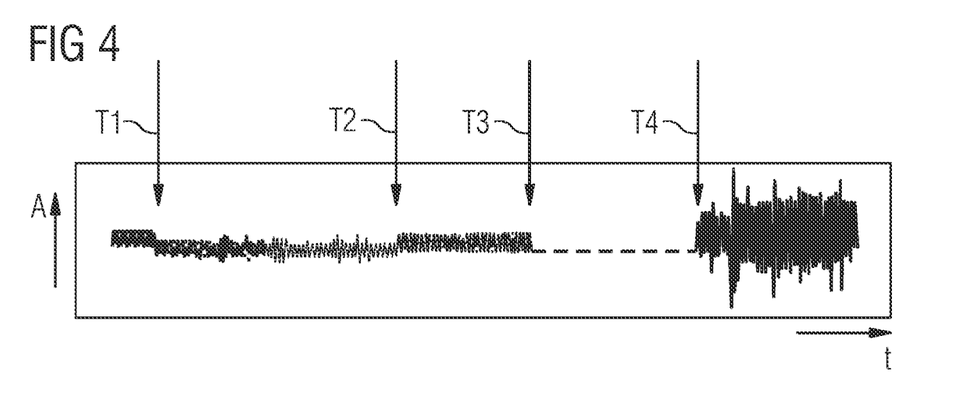
FIG. 4 shows an exemplary graphical plot of a temporal representation of a sensor signal after sensor reassembly without realignment of the coordinate system.

FIG. 4 represents an exemplary graphical plot of a temporal representation of a sensor signal A, an axis of the three-axis acceleration sensor over a time axis t after sensor reassemblies with the time instants T1-T4 without the respective realignment of the coordinate system of the sensor orientation OES.

The sensor signal has a sensor data triple (x,y,z) comprising the individual sensors of the three-axis acceleration sensor. The individual sensors each represent an axis of the three-axis acceleration sensor.

In the present context, the realignment of the coordinate system is understood to mean that method in which a realignment of the position vector LV takes place with respect to the gravitational vector, in other words a performance of method steps d) to f). The gravitational vector is present in the direction of the gravitational force of the earth gravitation.

In the curve shown, it can be seen that detected sensor data can be unfavorable for a subsequent application of an ML model MLM. The model MLM is based on the sensor S1 with an orientation OS1, which was however replaced by the replacement sensor ES with a new orientation OES, where the orientation OS1 does not correspond to the orientation OES.

Figure 5:
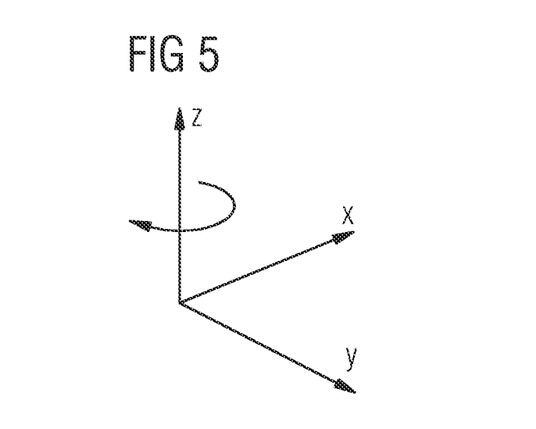
FIG. 5 shows a representation of a change in the sensor orientation about the z-axis after sensor reassembly.

FIG. 5 shows a representation of a change in the sensor orientation about the z-axis after a sensor reassembly, as can occur as a result of mechanical tolerances due to the mechanical fastening of the sensor. For instance, large fastening holes combined with excessively thin fastening screws can enable a twisted assembly.

For instance, the orientation, i.e., the rotational position of the SITRANS MS200 sensor as a replacement sensor ES, in which the thread is an integral part of the housing, does not necessarily coincide with that orientation during the initial assembly of the first acceleration sensor S1 after a renewed correct fastening.

Figure 6:
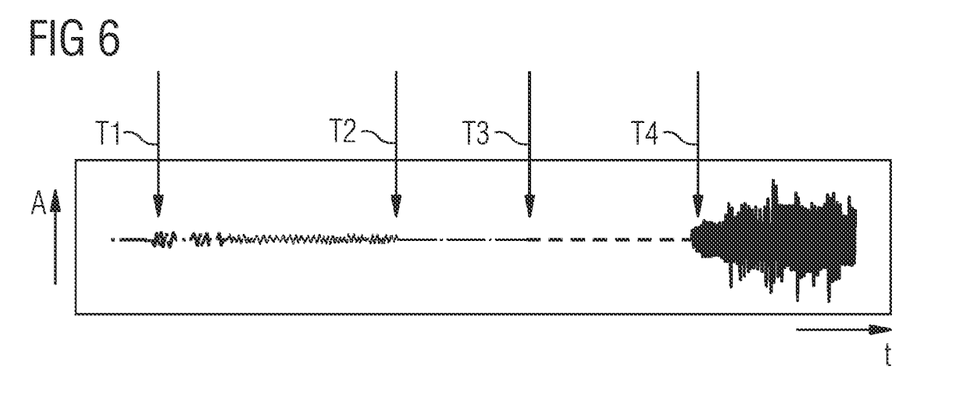
FIG. 6 shows an exemplary graphical plot of a temporal representation of a sensor signal after sensor reassembly after realignment of the coordinate system.

FIG. 6 shows an exemplary graphical plot of a temporal representation of a sensor signal after sensor reassembly according to an inventive realignment of the coordinate system, in other words correction of the position vector LV.

The "realignment of the coordinate system" can be identified by correcting the position vector of the sensor in the sensor signal A, and the improvement of the corresponding sensor data associated therewith, in particular at the points in time T1 to T4, at which a sensor change was performed.

The realignment of the coordinate system refers to a correction of the position vector of the sensor after the method steps d) to f), which results in no renewed training of the ML model MLM being required for the technical object TO.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for monitoring the operation of a technical object aided by a mathematical model based on machine learning after assembly of a three-axis replacement acceleration sensor, a three-axis first acceleration sensor being initially assembled on the object at a position, and during operation the object generating mechanical oscillations, the method comprising:
   a) determining a first orientation of the three-axis first acceleration sensor on the object as a position vector relative to gravitational force;
   b) generating and training the mathematical model for the operation of the object with respect to the position vector;
   c) detaching the three-axis first acceleration sensor and assembling the three-axis replacement acceleration sensor with a new orientation on the object at the same position, at which the first acceleration sensor was assembled;
   d) detecting acceleration values in an x-, y- and z-direction aided by respective individual sensors of the three-axis replacement acceleration sensor of the object;
   e) calculating respective indicator values from a temporal course of the detected acceleration values of the three-axis replacement acceleration sensor;
   f) determining a replacement vector from the calculated respective indicator values and determining a differential vector between the replacement vector and the position vector of the first acceleration sensor determined during said generating and training of b);
   g) applying the model during operation of the object for the position vector in the orientation of the replacement vector by taking into account the differential vector.

2. The method as claimed in claim 1, wherein the indicator value is determined aided by an average value over a temporal sequence of acceleration values.

3. The method as claimed in claim 1, wherein the indicator value is determined aided by a steady component of a Fast Fourier transform (FFT) over a temporal sequence of acceleration values.

4. The method as claimed in claim 1, wherein if a predetermined limit value is exceeded for the differential vector determined during said determining a replacement vector of f), then a correction of the position vector is performed aided by the differential vector determined during said determining a replacement vector of f).

5. The method as claimed claim 1, wherein if a predetermined limit value is exceeded for the differential vector determined during said determining the replacement vector of f), then a sensor change from the three-axis first acceleration sensor to the replacement acceleration sensor is identified.

6. The method as claimed in claim 1, wherein a Euclidean distance for the differential vector determined during said determining the replacement vector of f) is formed over at least one point in time, and an operating state analysis of the object is performed by applying the mathematical model and the Euclidean distance of the differential vector.

7. The method as claimed in claim 1, wherein the differential vector is determined repeatedly over a temporal course and an average value is calculated over the temporal course of the differential vector.

8. The method as claimed in claim 1, wherein a mathematic model is generated, trained and applied based on machine learning for the object aided by the differential vector determined during said determining the replacement vector of f), and the operation of the object is monitored with the aid of the model.

9. The method as claimed in claim 7, wherein the mathematical model is generated, trained and applied with aided by the temporal course of the differential vector.

10. The method as claimed in claim 8, wherein the mathematical model is generated, trained and applied with aided by the temporal course of the differential vector.

11. The method as claimed in claim 1, wherein the three-axis first acceleration sensor and the replacement acceleration sensor are identical in construction.

12. The method as claimed in claim 1, wherein during said detecting acceleration values of d) the object is in operation.

13. A computer program, comprising commands, which with its execution by a computer, trigger this to execute the method as claimed in claim 1.

14. A non-transitory electronically readable data carrier with readable control information stored thereupon, which comprise at least one computer program, which when executed by a computer, when the non-transitory electronically readable data carrier data carrier is used in a computing facility, cause operation of a technical object aided by a mathematical model to be monitored based on machine learning after assembly of a three-axis replacement acceleration sensor, a three-axis first acceleration sensor being initially assembled on the object at a position, and during operation the object generating mechanical oscillations, the computer program comprising:
 a) program code for determining a first orientation of the three-axis first acceleration sensor on the object as a position vector relative to gravitational force;
 b) program code for generating and training the mathematical model for the operation of the object with respect to the position vector;
 c) program code for identifying detachment of the three-axis first acceleration sensor and assembling the three-axis replacement acceleration sensor with a new orientation on the object at the same position, at which the first acceleration sensor was assembled;
 d) program code for detecting acceleration values in an x-, y- and z-direction aided by respective individual sensors of the three-axis replacement acceleration sensor of the object;
 e) program code for calculating respective indicator values from a temporal course of the detected acceleration values of the three-axis replacement acceleration sensor;
 f) program code for determining a replacement vector from the calculated respective indicator values and determining a differential vector between the replacement vector and the position vector of the first acceleration sensor determined during said generating and training of b);
 g) program code for applying the model during operation of the object for the position vector in the orientation of the replacement vector by taking into account the differential vector.

15. A computing apparatus for monitoring the operation of a technical object, comprising:
 a computing apparatus with a memory; and
 a connected detector for detecting sensor values in the form of a three-axis acceleration sensor;
 wherein the computing apparatus is configured to generate, train and store a mathematical model based on machine learning, and the three-axis acceleration sensor is assembled at a position on said object, and the object generates mechanical oscillations during operation; and
 wherein the computing apparatus is configured, aided by sensor values detected by the connected detector, to:
 a) determine a first orientation of the three-axis first acceleration sensor on the object as a position vector relative to gravitational force;
 b) generate and train the mathematical model for the operation of the object with respect to the position vector;
 c) identify detachment of the three-axis first acceleration sensor and identify assemble of the three-axis replacement acceleration sensor with a new orientation on the object at the same position, at which the first acceleration sensor was assembled;
 d) detect acceleration values in an x-, y- and z-direction aided by respective individual sensors of the three-axis replacement acceleration sensor of the object;
 e) calculate respective indicator values from a temporal course of the detected acceleration values of the three-axis replacement acceleration sensor;
 f) determine a replacement vector from the calculated respective indicator values and determine a differential vector between the replacement vector and the position vector of the first acceleration sensor determined during said generating and training of b);
 g) apply the model during operation of the object for the position vector in the orientation of the replacement vector by taking into account the differential vector.

* * * * *